ACCESSIBLE LINE TRAP TUNING UNIT

Filed March 16, 1967 2 Sheets-Sheet 1

WITNESSES

Theodore F. Wrobel

E. Strickland

INVENTORS
James J. Mc Nally, Jimmie L. Snyder
and John P. Cage

BY F. P. Lyle

ATTORNEY

March 31, 1970 J. J. McNALLY ET AL 3,504,310

ACCESSIBLE LINE TRAP TUNING UNIT

Filed March 16, 1967 2 Sheets-Sheet 2

United States Patent Office 3,504,310
Patented Mar. 31, 1970

3,504,310

ACCESSIBLE LINE TRAP TUNING UNIT

James J. McNally, Bloomington, Ind., Jimmie L. Snyder, Jackson, Mich., and John P. Cage, Ellettesville, Ind., assignors to Westinghouse Electric Corporation, Pittsburgh, Pa., a corporation of Pennsylvania Filed Mar. 16, 1967, Ser. No. 623,768
Int. Cl. H01h *7/10;* H03h *7/10*
U.S. Cl. 333—76 6 Claims

ABSTRACT OF THE DISCLOSURE

A line trap tuner design to be manually inserted into and removed from an insulated end plate covering an opening formed by the main, cylindrically shaped power current coil forming part of a line trap device. The tuner comprises a molded base structure formed with structures for receiving and holding capacitors, resistors and/or inductors in an upright, open and accessible manner for effecting quick capacitor or connection changes, such changes being methods for tuning the line trap. The end cover plate is provided with at least one opening for receiving the tuner. In one embodiment of the invention, two terminal blades are provided in the opening and behind the cover plate for engaging corresponding resilient terminal means attached to a molded base when the tuner is inserted into the opening in the cover plate. In another embodiment of the invention, terminal brackets are attached to the outside of the cover plate for receiving corresponding terminal bearing pins attached to the molded base of the tuner. The terminal brackets support the tuner as well as providing electrical terminals for connecting the tuner components to the power coil. The exposed (outside) surface of the molded base may be provided with a handle or other suitable means for effecting the manual insertion and removal of the tuner.

Background of the invention

The present invention relates generally to line traps or resonated inductances for use in power lines simultaneously handling carrier frequencies and power frequencies. The invention relates especially to an easily accessible type of tuning means that is quickly and simply inserted into and removed from the line trap unit.

A line trap is a resonated inductance for use in power lines over which carrier channels have been established. The trap presents a high impedance to the carrier frequency, or band of frequencies, while the impedance at power frequency is negligible. Line traps increase the effective range of carrier equipment by reducing the loss of carrier power in connected lines or networks not being used for carrier communication or relaying. The line trap will permit normal carrier operation when these lines or networks are grounded for 60 cycle power. Interference is reduced between carrier channels, and the reliability of carrier channels is assured even under adverse conditions caused by short circuits, grounds or switching phenomena on connected lines.

Heretofore, line traps have been tuned with relatively large tuning assemblies disposed inside the cylindrical structure formed by the turns of the main power current coil. The tuning components (resistors, inductors and capacitors) have been housed in elongated containers disposed axially and near the center of the main coil structure. In at least one of the containers was disposed a lightning arrester connected to protect the main coil from lightning conditions. Access to the tuners was obtained from one end of the main coil structure by removing end covers (bird guards) from the structure. The tuners were then adjusted or tuned without their removal from the main coil and power circuit. To insure the safety of workmen, the high voltage line had to be deenergized for tuning as well as for repair and replacement purposes. The time during which the line is shut down was costly down time for the power companies.

Brief summary

The present invention provides a line trap tuning unit or assembly which can be easily removed from an insulating end plate covering the end of the main coil structure. The unit is removed for tuning, repair or replacement purposes so that the high voltage line and main coil need not always be deenergized. This is accomplished by use of a short, compact tuning unit having a molded base, the inside surface of which is provided with means for receiving the tuning components in an upright, open and accessible manner when the unit is removed from the main coil, and a cover or shell is removed from the molded base. The frequency range of the tuner can be expediently changed (with the components being fully accessible) by connecting the components in parallel or series, by shorting certain components, by exchanging components with others of different values, or by removing a component from the circuit with leads and connectors suitably provided. A variety of combinations and frequency ranges are thus available by the simple process of exchanging components and connecting or removing lead wires.

At least one of the plates covering the ends of the cylindrically shaped main coil is provided with at least one opening for receiving the tuner. Behind the opening (in one embodiment of the invention), and extending generally in a diametrical direction from opposed sides thereof are permanently disposed two terminal blades for slidably engaging corresponding terminal contact receptacles disposed on the periphery of the molded base when the tuner is inserted into the opening provided in the end plate. A shell structure covering the components disposed on the molded base is provided with two externally indented and longitudinally extending guides formed on the opposite sides of the shell. The guides accommodate the blades when the tuning unit is directed into the opening, and the guides may be further sloped to guide the blades into the terminal contact receptacles on the base. With such means, initial orientation of the tuning unit in the cover plate opening is insubstantial. The workman simply places the top of the shell in the cover plate opening and then rotates the unit a maximum of 90° until the guides in the shell seat against the blades. The workman then directs the unit into the opening until the blades seat in the terminal receptacles.

The terminal blades and contact receptacles electrically connect the main coil to the prewired tuner components; no other connecting or switching means is required thereby making the tuning assembly a relatively simple, low cost yet effective and versatile tuning device.

In another embodiment of the invention, the tuning unit is disposed in a generally rectangular opening in the cover plate with its longitudinal axis extending in a direction perpendicular to the axis of the main power coil. Electrical contact and physical support for the tuning unit are provided by two bearing terminal pins disposed externally on the opposite sides of the molded base, and a pair of corresponding hook-shaped brackets permanently disposed on the cover plate adjacent the opening. The tuning unit is connected in service by first disposing the base end thereof adjacent the hook shaped brackets to seat the terminal bearing pins therein. The bearing pins allow the unit to pivot thereabout as it is desired into the cover plate opening. The tuning unit is secured in the opening by a latch means provided on the top of the shell.

In both embodiments, the tuner can be removed and inserted with full line voltage on the main coil thereby limiting costly shut-down. Further, the tuner is accessible from outside of the line trap coil thereby eliminating the need for removing the end cover plates.

The drawings

The advantages and objects of the invention will be more apparent from the following detailed description taken in connection with the accompanying drawing in which.

Description of the preferred embodiments

Figure 1:
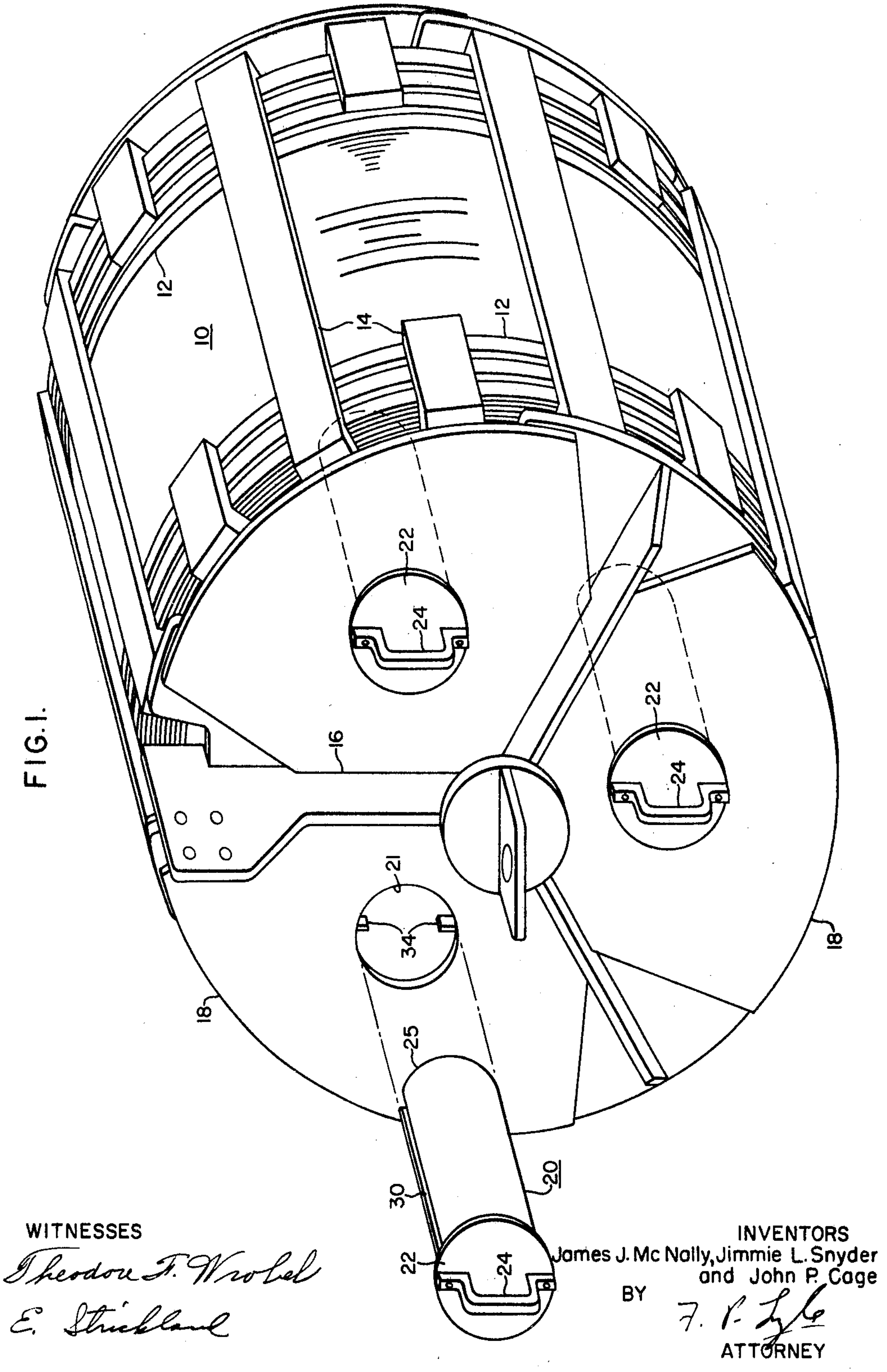
FIGURE 1 is an isometric view of one embodiment of the invention showing a line trap coil structure and a tuning unit removed therefrom.

Specifically, the invention includes a large main or power current coil generally designated 10. The coil in FIG. 1 comprises multiple layers of metal bar turns 12 wound in parallel to provide the greatest possible strength to withstand fault current stresses. For higher current ratings, stranded aluminum cable may be used in place of the bar turns to reduce eddy current losses. In either case, the main coil 10 forms a relatively large cylindrical unit.

The coil structure 10 is supported by a liberal number of molded insulating spacers 14 which provide positive conductor separation.

The molded coil structure 10 may be supported and secured between two spider end frames 16 (only one of which is shown) which serve generally as lifting means, mounting means and electrical terminal means. Between the legs of the spider are secured insulating end cover plates 18 generally known as bird barriers, which prevent the entrance of objects that may cause short circuiting of the coil turns 12. The end covers are held in place by captive hardware not shown. The spider frame 16 may be modified or replaced by other types of coil support structures that would allow a single disc type end plate to be employed in place of the three plates 18 shown in FIG. 1.

The main coil structure 10, when tuned, forms a line trap or resonated inductance for use in power lines (not shown) over which carrier frequency channels have been established. The resonated coil 10 presents a high impedance to the carrier frequency, or band of frequencies, while the impedance of the coil at power frequencies is negligible.

Figure 4:
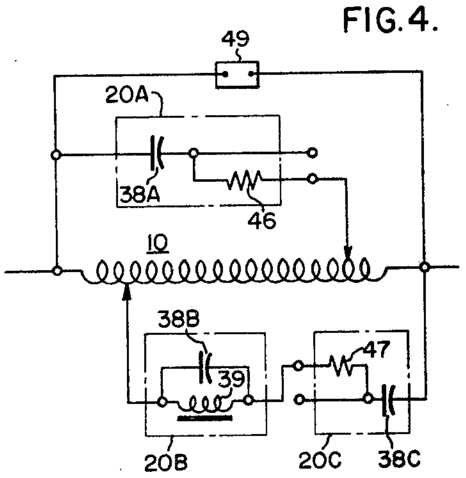
FIG. 4 is a schematic diagram of an embodiment of the invention in which three tuning units are employed.

In accordance with the invention, the main coil 10 is tuned with a novel tuning unit 20 designed to be easily inserted into and removed from the main coil without always necessitating deenergization of the power line. In the embodiment of FIG. 1, this is accomplished by providing at least one of the end cover plates 18 with a round opening 21 dimensioned to receive the tuning unit in such a manner that its axis extends in a direction parallel to the axis of the main coil and perpendicular to the plane of the cover plate. In FIGS. 1 and 4 the complete line trap is shown provided with three tuning units, the units in FIG. 4 labelled 20A through 20C, though the invention is not limited thereto. The number and type of tuning units employed depends upon such factors as the frequency range and number of channels to be tuned.

The tuning unit 20 includes a molded base structure 22 designed to receive and hold tuning components such as capacitors and resistors (FIG. 3) in an upright manner so that they are easily accessible for effecting lead wire connections and other tuning, repair and replacement operations. In the embodiment of the invention shown in FIGS. 1 through 3, the base is provided with a lip or flange portion 23 that engages the cover plates 18 when the tuning units are fully inserted into the openings 21.

Figure 2:
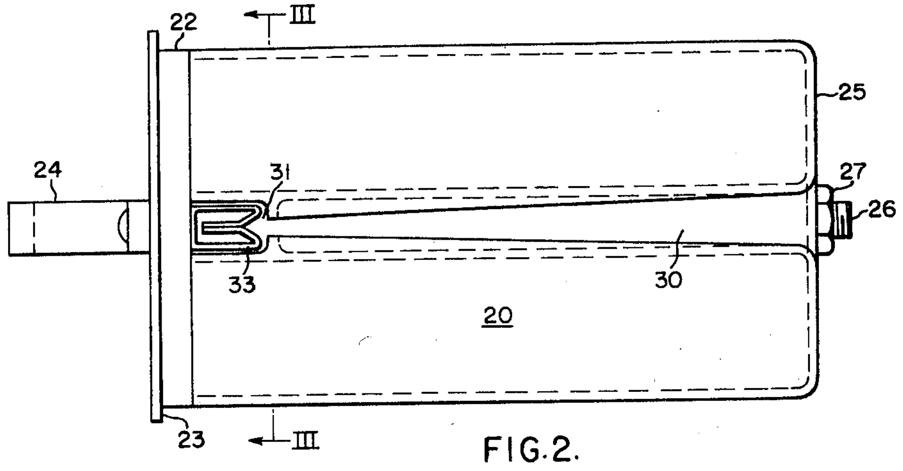
FIG. 2 is a side elevation view of the tuning unit shown in FIG. 1 constructed in accordance with the principles of the invention.

FIGS. 1 and 2 further show a handle means 24 attached to the outside surface of the base 22 for manual handling of the tuning unit 20. A hookeye structure (see FIG. 5) may be attached to the base in place of the handle 24, or in combination therewith, in order to allow hookstick handling of the tuning unit.

FIG. 2 shows a profile and side elevation view of the tuning unit 20 which includes further a cylindrical shaped cover or shell 25 fixed to the base 22 by an elongated insulating shaft or rod 26 and a nut 27. One end of the rod is suitably secured in the base while the other end extends through an opening (not shown) provided in the end of the shell 25 to receive the nut 27. The base and shell are sealed together to protect the components from the weather.

The outside periphery of the shell 25 is further provided with two diametrically opposed slots or grooves 30 which extend the axial length of the shell as best seen in FIG. 2. Each of the slots is shown tapered in the direction of the base 22 with an enlarged portion 31 at the base end provided to accommodate terminal contact receptacles 33 physically attached to the base. The contact receptacles are designed to resiliently engage terminal blade structures 34 which are fixed inside of the coil 10 and extend into the openings 21 in the cover plates 18 from diametrically opposite directions as shown in FIG. 1. The two axial slots 30 in the shell accommodate the blades 34 as the tuning unit is inserted into or removed from the opening 21.

When the tuning unit 20 is ready for insertion into the opening 21, only limited orientation thereof is necessary as mentioned earlier. The workman or operator simply places the end of the unit in the opening and rotates the unit until the grooves 30 find the blades 34, whereupon the workman directs the unit into the opening 21 until the blades seat in terminal contact receptacles 33.

The fixed blades 34 are electrically connected to the windings 12 within the cylindrical structure formed by the coil 10. Similarly, the resilient contact receptacles 33, attached to the base 22, are electrically connected to the tuning components disposed within the shell 25 attached to the base 22. When the tuning unit 20 is inserted in the opening 21 in cover plate 18, and the resilient contacts 33 engage the blades 34, the tuning components are connected in parallel with the main coil 10 as shown in FIG. 4.

Figure 3:
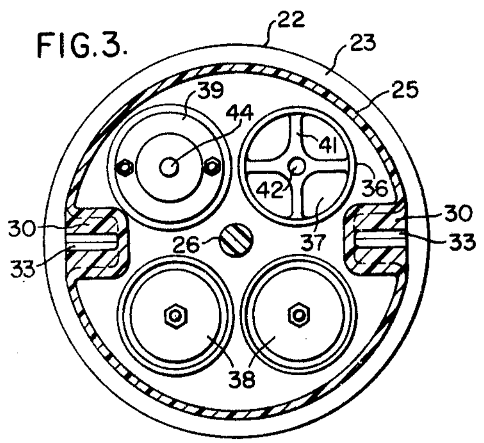
FIG. 3 is a cross-sectional view of the tuning unit of FIG. 2 with portions thereof shown in elevation.

In FIG. 3, three tuning components are shown in top plan view suitably attached to the inside surface of the base 22. The inside surface is provided with a plurality of cylindrical shaped wall structures 36 forming circular hollow areas 37 dimensioned to receive an end of a capacitor or fine tuning coil. In the embodiment of FIG. 3, four such wall structures and hollow areas are provided on the base 22, one of which is shown empty, while the other three are occupied respectively by two capacitors 38 and a coil 39. The inside bottom surface of the empty structure is shown provided with a cross-ribbed structure 41 having a bore 42 in the center thereof for receiving fastening hardware for securing a tuning component therein. Such structure is given by way of example only; other means may be provided for receiving and securing the components to the base 22.

The components are interconnected with each other and with the terminal contacts 33 by lead wires not shown in FIG. 3. With the cover 25 removed, the components (and lead wires) are easily accessible as seen from FIG. 3. By making appropriate connections, the main coil 10 can be easily tuned. The main coil can be further tuned by adjusting the inductance of the coil 39 with a centrally disposed plunger 44 that extends above the top surface of the coil. The main coil 10 may be further fine tuned by tapping the coil with appropriate means as indicated schematically by arrow lines in FIG. 4. Appropriate tapping means, for example, would include trimmer connector clamps (not shown) designed to be manually attached to an individual turn of the coil bars 12. The clamps permit simple and easy adjustment by being repositioned and tightened on the proper bar turn. The complete trap may be resonated to one or two frequencies in the range for which it is designed. In FIG. 4, the line trap is connected for double frequency operation, and is accordingly tapped adjacent both ends of the main power coil 10. For single frequency operation, only the upper tuning unit 20A is necessary.

For wide band operation (for example, 90 to 200 kc.) the two tuning units 20B and 20C are necessary. All three of the tuning units have identical physical dimensions so that complete versatility is obtained. For example, the two capacitors 38 (FIG. 3) may have different capacitance values, one value being appropriate for the purposes of tuning unit 20A and the other appropriate for the purposes of tuners 20B or 20C. With such or similar arrangements, the single tuning unit 20 can be made to serve a variety of purposes by the simple process of connecting and disconnecting and/or substituting appropriate components.

In FIG. 4, the tuning units 20A and 20C are further shown provided with resistors 46 and 47, respectively, with resistor 46 connected in series with capacitor 38A, and resistor 47 connected in series with capacitors 38B and 38C. Without the resistors connected in the tuning circuits, the line trap is ordinarily a "hi Q" device. By simply connecting the resistors as shown in FIG. 4, the line trap is "dequed," i.e., made a low Q trap. Low Q traps are particularly desirable when the carrier signal is frequency modulated. The resistors, being relatively small physically, require negligible space among the components disposed on the base 22 so that they may be secured in any suitable and convenient manner, for example, by the means effecting their electrical connection to the capacitors and terminal contacts 33.

The main coil 10 is protected from line fault conditions by a lightning arrester 49 connected across the coil and suitably supported inside the coil structure.

When the tuning components are properly chosen and connected for the desired operation, the cover 25 is placed over the components and secured in place on the base 22 by the rod 26 and nut 27. The tuner 20 is then inserted into the opening 21 provided in the cover plate 18 with the tapered grooves 30 provided in the cover positioned to accommodate the terminal blades 34. The entrance portion of the groove 30 at the end of the cover remote from the base 22 has ample width and rounded corners to provide easy accommodation of the terminal blades. The tuner is thrust forward until the resilient contacts 33 on the base 22 engage the terminal blades 34. The line trap is now tuned and ready for carrier frequency operation. The tuner may be further secured by suitable fastening hardware not shown, if desired.

When it is desired to retune or otherwise alter the operation of the line trap, the tuner 20 need only be removed from the coil structure 10 for retuning and then returning to the coil structure. The power need not always be removed, and the safety of the workmen is not jeopardized since the tuners 20 can be handled remotely, for example, with an insulated hookstick.

If the tuner 20 is removed and a frequency change is made by changing and/or removing the components, the main coil 10 must be fine tuned by adjustment of the above-mentioned trimmer connector clamps. In such a case, the power would then have to be shut down since the workman has to reach inside the main coil to relocate the connector clamps. The power need not, however, be shut down for fine tuning with the coil 39, or for other types of adjustment, for example, Q change adjustment.

Figure 5:
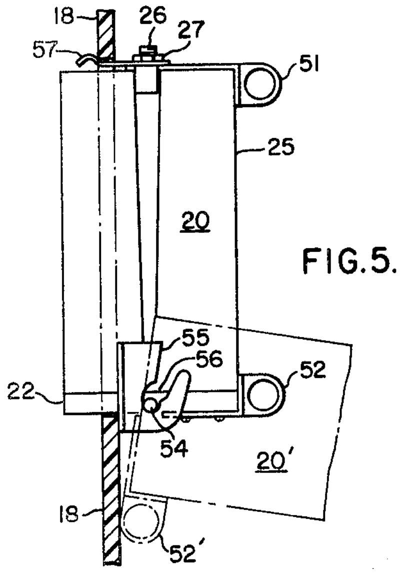
FIG. 5 is a side elevation view of another embodiment of the invention.
Figure 6:
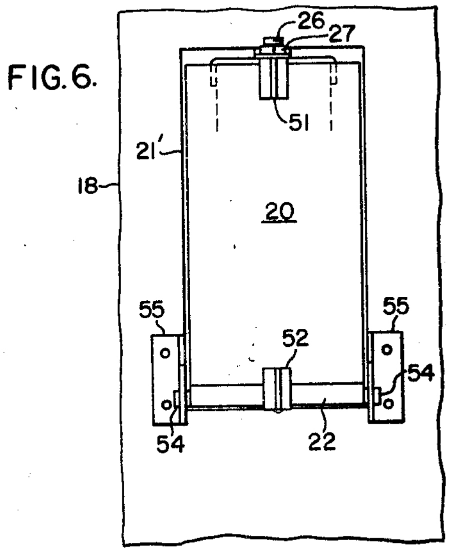
FIG. 6 is a front elevation view of the embodiment of FIG. 5.

Another embodiment of the invention is shown in FIGS. 5 and 6 in which the tuning unit 20 is disposed in the cover plate 18 with its axis extending in a direction substantially perpendicular to the axis of the main coil 10 and parallel to the plane of the cover plate. The cover plate is therefore provided with a rectangular opening 21′ (FIG. 6) as opposed to the circular opening 21 shown in FIG. 1.

In the embodiment depicted in FIGS. 5 and 6, the tuner 20 is electrically the same as and physically similar to the embodiments described above so that like numerals refer to like parts. The essential differences involve the elimination of the lip 23 on the molded base 22, the use of two hookeye structures or hardware 51 and 52 instead of the handle 24, and the employment of pivot or bearing terminal pins 54 and the terminal brackets 55 in place of the resilient contact means 33 and terminal blades 34 respectively.

As best seen in FIG. 5, the lip 23 is omitted from the base 22 so that the hookeye hardware 51 and 52 can be secured in a flush manner against the side of the base and the cover 25. The upper hookeye structure 51 is secured to the top of the cover by the insulating rod 26 and the nut 27 as shown. In the same manner, a resilient catch or latch 57 is attached to the cover.

The tuner 20 is electrically connected to the main coil 10 by way of the two bearing terminal pins 54 disposed on opposed sides of the base 22, and the terminal brackets 55 suitably fixed to the outside of the cover plate 18 adjacent the lower corners of the rectangular opening 21′. The terminal pins and brackets serve further as support means for the tuning unit.

When the tuning unit 20 is ready to be connected in service, the base of the unit is first positioned adjacent the brackets 55 so that the terminal pins 54 can be guided into a recess 56 provided in each of the brackets as seen in FIG. 5. This may be accomplished by handling the tuning unit with a hookstick (not shown) engaging the lower hookeye 52. With the tuning unit so disposed, the hookstick may then be removed from the lower hookeye and placed to engage the upper hookeye 51. The hookstick is then directed upwardly so that the tuning unit enters the opening 21′ provided in the cover plate 18 by pivoting about the terminal bearing pins 54. When the tuning unit enters the opening 21′, the latch means 57 is resiliently deflected in a downward direction by the edge of the upper wall structure of the cover plate 18. When the latch passes the edge it regains its original position to hold the tuning unit in place as shown.

The latch 57 further serves to force the terminal pins 54 down against the brackets 55 latched in portion in the opening 21′. This insures good electrical contact, and the pins and brackets are further silver plated to provide weather resistance and low resistance contact between the pins and brackets.

Since the terminal pins 54 and the terminal brackets 55 are electrical terminals as well as mechanical support means, the tuning unit 20 is electrically connected in service when it is mounted on the cover plate 18 as described above.

When it is desired to tune or alter the operation of the line trap, a hookstick is again employed to engage the upper hookeye 51 to pull the tuning unit from the opening 21′. Under force of the pull, the latch 57 releases thereby allowing the tuning unit to travel down to the position shown in phantom in FIG. 5, and designated 20′. The hookstick is then removed from the hookeye 51 and inserted into hookeye 52 (presently in the position designated 52′). The hookstick is moved upwardly until the terminal pins 54 clear the latches 55. The tuning unit is then brought down so that its cover 25 can be removed and the adjustments made as described earlier.

It should be apparent from the foregoing description that a new and useful line trap tuning unit has been disclosed which permits rapid and easy tuning of the main coil with limited deenergization thereof. This is accomplished by a plug-in or swing-in (hook and latch) type units that are easily inserted into and removed from the main coil structure, the unit and main coil structure being provided with mating terminal means. The tuner comprises a molded base structure which supports the tuning components in an open, upright manner so that connections can be quickly made and components easily replaced in the process of tuning, repairing and otherwise altering the unit.

Though the invention has been described with a certain degree of particularity, it should be understood that the disclosure has been made by way of example only and that changes may be made therein without departing from the spirit and scope of the invention.

What is claimed is:

1. In line trap apparatus having a main power coil forming a hollow cylindrical structure, insulating cover plates disposed over the ends of said cylindrical structure, an opening provided in at least one of said plates, and fixed terminal means physically associated with and electrically connected to the power coil, a compact unitary device for tuning the line trap apparatus, and dimensioned for disposal in the opening provided in said cover plate, the tuning unit comprising an insulating, molded base structure, tuning components physically supported on a surface of said base structure in an upright, exposable manner to allow easy access thereto for making circuit changes, said circuit changes effecting the tuning of the line trap apparatus, a removable shell structure covering said components and secured to said base structure, and terminal contact means electrically connected to said components and physically disposed on the tuning unit to engage the terminal means of the power coil when the unit is properly disposed in the opening provided in said cover plate, said fixed terminal means including terminal blades disposed in the opening and behind the cover plate, and said terminal contact means including terminal receptacles attached to the base structure for resiliently engaging the blades when the tuning unit is inserted into the opening provided in the cover plate.

2. In line trap apparatus having a main power coil forming a hollow cylindrical structure, insulating cover plates disposed over the ends of said cylindrical structure, an opening provided in at least one of said plates and fixed terminal means physically associated with and electrically connected to the power coil, a compact unitary device for tuning the line trap apparatus, and dimensioned for disposal in the opening provided in said cover plate, the tuning unit comprising an insulating, molded base structure, tuning components physically supported on a surface of said base structure in an upright, exposable manner to allow easy access thereto for making circuit changes, said circuit changes effecting the tuning of the line trap apparatus, a removable shell structure covering said components and secured to said base structure, and terminal contact means electrically connected to said components and physically disposed on the tuning unit to engage the terminal means of the power coil when the unit is properly disposed in the opening provided in said cover plate, said fixed terminal means including metal brackets attached to the cover plate, and said terminal contact means attached to the base structure including bearing pins for engaging said metal brackets, the metal brackets and said pins supporting said tuning unit adjacent the cover plate and the opening provided therein.

3. The apparatus of claim 1 in which the length dimension of the turning unit within the main power coil is supported in a direction substantially parallel to the axis of the coil and perpendicular to the plane of the cover plate.

4. The apparatus of claim 2 in which the tuning unit is supported in the opening in the cover plate in such a manner that the axial length of the unit extends in a direction substantially perpendicular to the axis of the main power coil and parallel to the plane of the cover plate.

5. The line trap apparatus of claim 1 in which the shell structure is provided with two longitudinally extending grooves in the outside surface thereof for receiving and guiding the terminal means of the power coil to the terminal contact means provided on the base structure.

6. In line trap apparatus having a main power coil forming a hollow cylindrical structure, insulating cover plates disposed over the ends of said cylindrical structure, an opening provided in at least one of said plates, and fixed terminal means physically associated with and electrically connected to the power coil, a unitary tuning device for tuning the line trap apparatus adapted to be disposed in said opening at least partially within the cover plate, said tuning device comprising an insulating base member, a plurality of tuning components supported on the base member in a manner to permit circuit changes to effect tuning of the line trap apparatus, a removable cover member secured to the base member and covering said tuning components, and terminal contact means electrically connected to said tuning components and physically disposed on the tuning device to engage said fixed terminal means when the tuning device is positioned in the opening in the cover plate, said fixed terminal means including terminal members disposed within the power coil behind the cover plate, and said terminal contact means including contact members attached to the tuning device in position to engage said terminal members when the tuning device is inserted into the opening in the cover plate.

References Cited

UNITED STATES PATENTS 2,579,544 12/1951 Brown -------------- 333—76

ELI LIEBERMAN, Primary Examiner

T. J. VEZEAU, Assistant Examiner

U.S. Cl. X.R.

333—70, 76